June 23, 1942.   R. T. PALMER   2,287,268
PSYCHROMETICALLY CONTROLLED AIR COOLING SYSTEM
Filed May 18, 1940
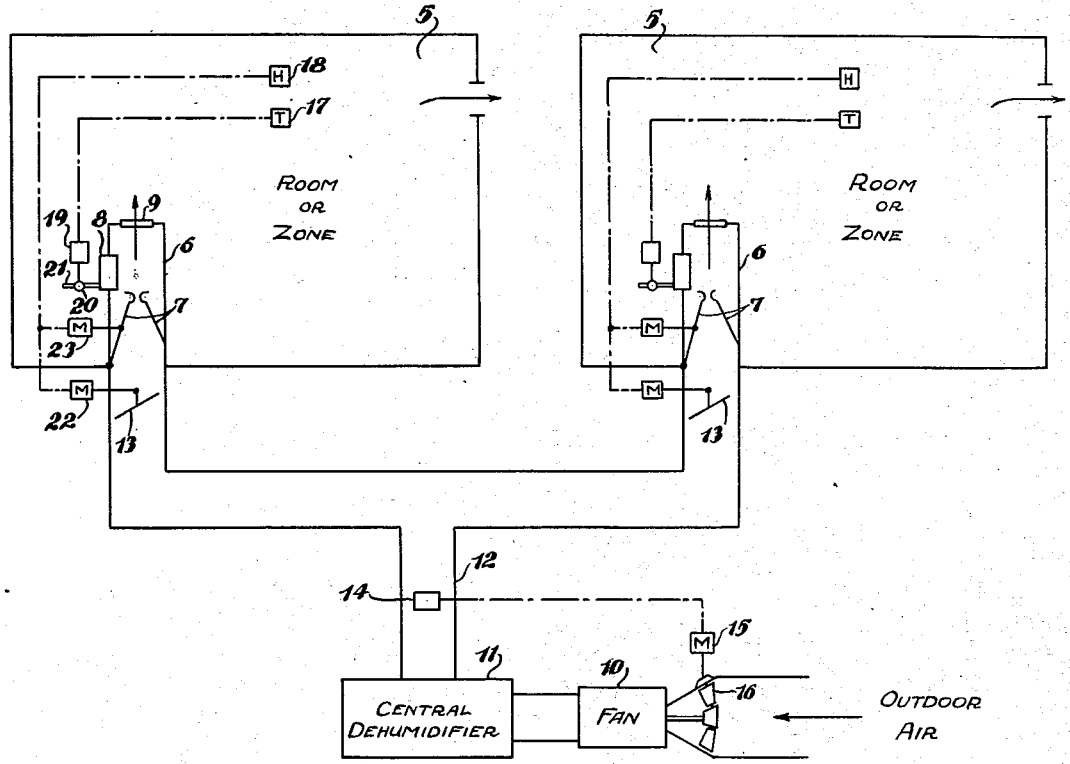
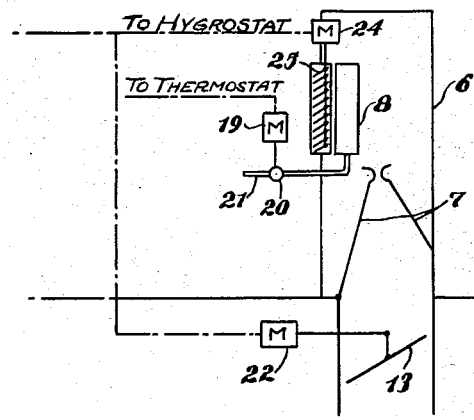
INVENTOR
Robert T. Palmer Patented June 23, 1942

2,287,268

UNITED STATES PATENT OFFICE 2,287,268

PSYCHROMETRICALLY CONTROLLED AIR COOLING SYSTEM

Robert T. Palmer, Sharon, Mass., assignor to B. F. Sturtevant Company, Boston, Mass.

Application May 18, 1940, Serial No. 335,967

4 Claims. (Cl. 236—44)

This invention relates to the automatic control of air cooling systems and relates more particularly to the thermostat and hygrostat control of air cooling systems utilizing local air recirculation units.

For certain types of air cooling installations, it is preferred to dehumidify the air at a central point, to supply the dehumidified air under substantial static pressure to local recirculation units utilizing ejectors, in the rooms to be served, and supplying the dehumidified air to the ejectors to induce the flow of room air as recirculated air through the units to be mixed therein with the dehumidified air. In such systems, it is usual to take care of local sensible heat changes by adjusting the temperature of local sensible coolers in the recirculated air stream. This invention provides improvements in such systems.

A feature of this invention resides in adjusting the volume of dehumidified air supplied to a local room or zone conformably with humidity changes therein and coordinately therewith adjusting the volume of recirculated air for maintaining a substantially constant volume in the air circulated through the local room or zone.

Another feature of this invention resides in adjusting independently the volume of dehumidified air supplied to each of a plurality of local ejector units conformably with humidity changes in the local rooms or zones supplied thereby, and coordinately therewith adjusting the air pressure supply source to maintain a substantially constant static pressure.

The invention will now be described with reference to the drawing, of which:

Fig. 1 is a schematic view of an air conditioning system embodying this invention, and Fig. 2 is a schematic view illustrating another way of controlling the volume of recirculated air entering a local recirculation unit.

The rooms or zones 5 contain the local air ejector units 6 which may be of the general type disclosed in the U. S. Patent No. 2,000,597 which issued May 7, 1935 on an application of R. E. Keyes. Each unit 6 contains the ejector formed by the nozzles 7, a recirculated air inlet containing the air cooler 8 and the air outlet 9.

The central fan 10 forces outdoor air under pressure through the central dehumidifier 11 and then through the supply ducts 12 to the ejectors in the units 6. The branch duct to each unit contains the damper 13 for varying the volume of dehumidified air supplied to the units. The main duct 12 contains a pressurestat 14 for adjusting through the motor 15, the spin inducing vanes 16 in the inlet of the fan 10 for maintaining a constant air pressure in the supply duct.

The fan 10 is preferably of the type disclosed in the U. S. Patent No. 1,989,413 issued Jan. 29, 1935 on an application of H. F. Hagen.

Each room or zone 5 contains a thermostat 17 and a hygrostat 18 for maintaining the desired local air conditions. The thermostats 17 control the motors 19 which adjust the valves 20 in the refrigeration supply lines 21 to the coolers 8, and adjusts the temperature of each cooler conformably with local sensible heat variations and thus takes care of local sensible heat gains without the necessity for adjustment of the temperature of the dehumidified air from the dehumidifier 11.

The hygrostats 18 by adjustment of the dampers 13 by means of the motors 22, vary the volume of dehumidified air reaching the ejectors conformably with local relative humidity changes. This satisfies ventilation requirements for it may be demonstrated that in an air cooling system with a human load, the relative humidity changes conformably with the number of occupants. It is desired however, to maintain as near as possible, a substantially constant volume of air circulated by the units 6. Adjustment by the dampers 13, of the volume of air to the ejector nozzles 7 also adjusts the total volume of air since it affects the ability of the ejectors to induce the flow of recirculated air. Accordingly in the embodiment of Fig. 1, when the dampers 13 are adjusted by the hygrostats 18 to increase the volume of air to the units 6, the motors 23 are actuated to adjust the spacing of the ejector nozzles 7 to move them further apart thereby decreasing the ejector action and decreasing the volume of recirculated air.

In the embodiment of Fig. 2, instead of adjusting the ejector nozzles when the volume of air to the units is varied by adjustment of the dampers 13, the motors 24 adjust the dampers 25 in the recirculated air inlet to vary the volume of recirculated air. As the volume of air to a unit 6 is increased, the motor 24 of that unit adjusts its associated damper 25 towards closed position to decrease the volume of recirculated air.

The ability of the ejectors in the units 6 to induce the flow of recirculated air depends directly upon the pressure of the dehumidified air supplied to them. The ability of the fan 10 to provide a given air pressure depends in turn, upon the air resistance in the air flow path.

Adjustment of the dampers 13 to one unit 6 and of the ejectors in the unit, or of the ejectors in the unit will change the air resistance and accordingly the air pressure. To prevent therefore the adjustment of the air to one unit 6 from affecting the performance of the ejectors in the other unit or units, the pressurestat 14 adjusts through the motor 15, the vanes 16 in the inlet to the fan 18 to cause it to maintain a constant air pressure in the air supply duct to the units.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. An air conditioning system comprising a central dehumidifier, a local sensible cooling unit, means forming a recirculated air inlet into said unit, an ejector in said unit connected to said dehumidifier for inducing the flow of recirculated air through said inlet under the action of air from said dehumidifier, means for varying the volume of air from said dehumidifier conformably with humidity changes in the space served, means including a fan for maintaining a static pressure in the air from said dehumidifier to said ejector, and means including spin inducing vanes in the inlet of said fan for varying the pressure in the air supplied by said fan conformably with pressure changes in the air between said dehumidifier and said ejector.

2. An air conditioning system comprising a central dehumidifier, a local sensible cooling unit, means forming a recirculated air inlet into said unit, an ejector in said unit connected to said dehumidifier for inducing the flow of recirculated air through said inlet under the action of air from said dehumidifier, means for varying the volume of air from said dehumidifier conformably with humidity changes in the spaces served, means for varying the volume of recirculated air through said inlet by decreasing the volume of recirculated air upon an increase in the volume of dehumidified air and by increasing the volume of recirculated air upon a decrease in the volume of dehumidified air, means including a fan for maintaining a static pressure in the air from said dehumidifier to said ejector, and means including spin inducing vanes in the inlet of said fan for varying the pressure in the air supplied by said fan conformably with pressure changes in the air between said dehumidifier and said ejector.

3. An air conditioning system comprising a central source for supplying conditioned air under pressure, a local recirculation unit having an air outlet in the conditioned space and having a primary air inlet in its base, a duct connecting said inlet and said source, means forming a recirculated air inlet in a side wall of said unit, a sensible cooler in said unit in alignment with said recirculated air inlet, means forming an ejector in said unit between said inlets for inducing the flow of recirculated air through said recirculated air inlet and said cooler, through the flow of primary air from said source therethrough, damper means in both of said inlets, and means including local, psychrometrically responsive means for adjusting said damper means for varying the volume of primary air supplied from said source through said duct to said unit, and for so decreasing the volume of recirculated air when the volume of primary air is increased and for so increasing the volume of recirculated air when the volume of primary air is decreased, that at all times a substantially constant total air volume is supplied to said outlet.

4. An air conditioning system comprising a central source for supplying conditioned air under pressure, a local recirculation unit having an air outlet and a recirculated air inlet in the conditioned space, an ejector in said unit connected to said source for inducing the flow of recirculated air into said inlet through the flow of the conditioned air from said source, and for discharging the mixed air through said outlet, means including local psychrometrically responsive means for varying the volume of air supplied from said source to said ejector, and means for so adjusting said ejector that upon an increase in the volume of conditioned air thereto, its air inducing action is decreased and upon a decrease in the volume of conditioned air thereto, its air inducing action is increased whereby at all times a substantially constant mixed air volume is supplied through said outlet.

ROBERT T. PALMER.